(No Model.)
J. H. WITT.
PLANT SHIELD AND ERECTOR FOR PLOWS.
No. 310,109. Patented Dec. 30, 1884.
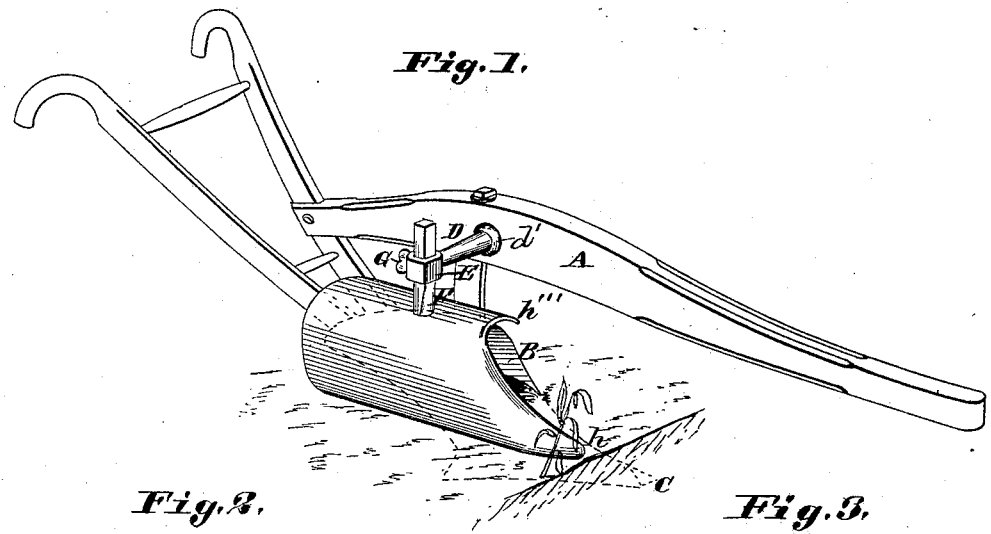
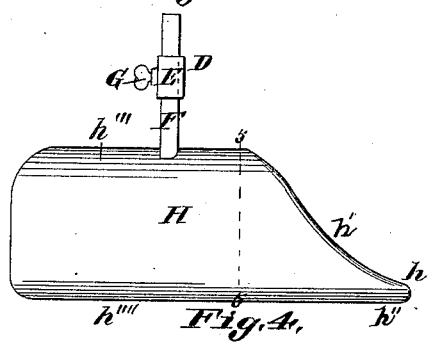
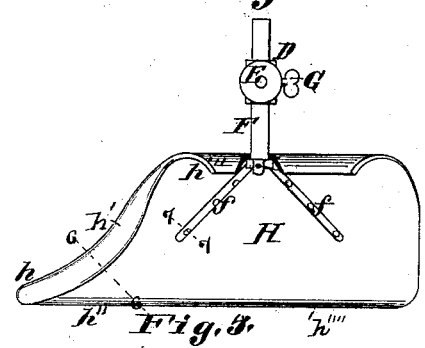
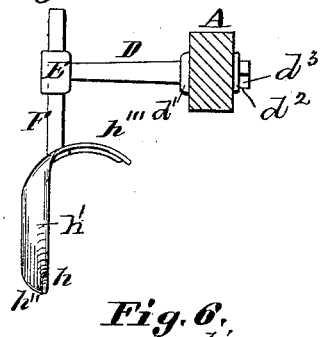
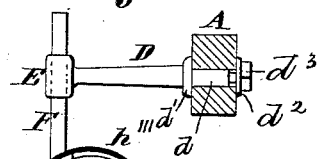
Attest:
Charles Pickles
Geo. L. Wheelock
Inventor:
Joseph H. Witt
By Knight Bros.
Attys.

UNITED STATES PATENT OFFICE.

JOSEPH H. WITT, OF BOBRING, MISSOURI.

PLANT SHIELD AND ERECTOR FOR PLOWS.

SPECIFICATION forming part of Letters Patent No. 310,109, dated December 30, 1884.

Application filed July 9, 1884. (No model.)

*To all whom it may concern:*

Be it known that I, JOSEPH H. WITT, of Bobring, in the county of St. Louis and State of Missouri, have invented a certain new and useful Plant Fender and Erector for Plows, of which the following is a full, clear, and exact description, reference being had to the accompanying drawings, forming part of this specification.

This invention relates to those fenders which are carried beside the mold-board of a plow at a distance therefrom and with concave side toward the plow, so as to allow the furrow to turn between them and prevent its being thrown against the plants which are being cultivated. I provide my fender with a rounded nose, that forms the front end of the shield, and which is formed to erect any plant lying in the course of the plow without injury to the plant.

Figure 1 is a perspective view of a right-hand plow with my device attached thereto. Fig. 2 is an outside view of the shield, and Fig. 3 is an inside view of the same. Fig. 4 is a front view of the shield, showing the plow-beam in transverse section. Fig. 5 is a transverse section through the shield and the beam at the point of connection. Fig. 6 is a section at 6 6, Fig. 3. Fig. 7 is a section at 7 7, Fig. 3.

The plow-beam is shown at A, the mold-board at B, and share at C, all these parts being of the usual construction.

I will say here that my shield is applicable to plows and cultivators in general, including shovel-plows.

D is an arm extending transversely from the beam, and having at its end a vertical eye, E, through whose square mortise extends the shield-standard F. The standard is vertically adjustable in the angular socket of the eye E, and is held to its adjustment by a set-screw, G. The arm may be attached to the plow-beam in any manner. I have shown it with a square tenon, $d$, passing transversely through the beam, with a shoulder, $d'$, bearing against one side of the beam, and a nut, $d^2$, and washer $d^3$ upon it, bearing against the other side of the beam. The shield H is made of general concavo-convex form in transverse section, the concave side being presented toward the mold-board, so that the furrow may have freedom to turn within the shield and become to a degree pulverized, and the earth does not escape sidewise, except at the tail end of the shield. The shield is made with a nose, $h$, rounded upon its outside, top $h'$, and bottom $h''$, so that it will cause no fracture or abrasion of plants with which it may come in contact. This nose runs along just above the surface of the ground in close proximity to the plants under cultivation, its purpose being to lift any plant or part of a plant that may be lying in the course of the plow, so as to prevent injury to it, and to prevent its being covered with earth. The convex shape of the upper part, $h'''$, of the body of the shield prevents injury to the plant as it is carried up over it, and the curved form of the lower edge, $h''''$, prevents injury to the stalk of the plant with which it may come in contact. I prefer to round the corners of the front part of the standard F in proximity to the shield, to prevent its damaging the plants lapping past it. The action of the mold-board of a plow is to throw the furrow upward and outward, at the same time inverting it to a greater or less extent. Consequently, if the plow is run near to the row of plants when they are weak or small, the earth covers them, and, where they are brittle, (as in case of young corn at a certain age,) breaks off the stalk. The earth is often cloddy, and the clods roll farther than the mellow earth is carried, so that while the plants are injured by the clods the plants are not benefited by loosening the earth by their roots or by spreading mellow earth around them. On the other hand, when my shield is used, the plow can be run so near the row as to loosen the earth among the roots of the plants, and the mellowed earth escaping from the rear of the shield gently flows among the stems of the plants standing erect either from natural position or from their erection by the shield. With potatoes and plants of a similar nature, which spread sidewise from the row, the use of the shield has special value, as the side branches are gently lifted out of the way of the plow and then allowed to fall down upon the plowed earth.

I propose to make the shield A of cast-iron, either made malleable or not, or of cast cast-steel, and the standard F of wrought or malleable iron; but I do not confine myself to these or to any particular material, as any suitable metal may be used without departure from the principle of the invention.

The standard may have branches $f$, secured by countersunk rivets to the shield, so as to leave a smooth outer surface to the shield.

The shield may be attached to some other part of the plow than the beam.

I claim as my invention—

1. A plow-fender consisting of a concavo-convex shield, H, having a nose, $h$, rounded upon its outside at the top and at the bottom, convex upper part, $h'''$, and curved lower edge, $h''''$, as shown and described.

2. A plow-fender formed with a nose, $h$, having a rounded outside, rounded top $h'$, and rounded bottom $h''$, as shown and described.

JOSEPH H. WITT.

Witnesses:
SAML. KNIGHT,
GEO. H. KNIGHT.